W. S. Wilmot.
Harvester Rake.
Nº 32493
Patented Jun. 4, 1861.
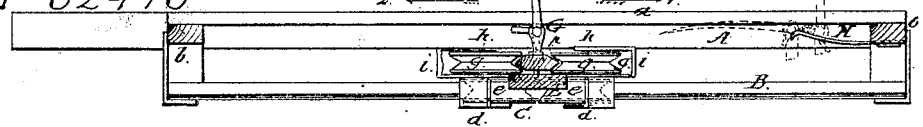
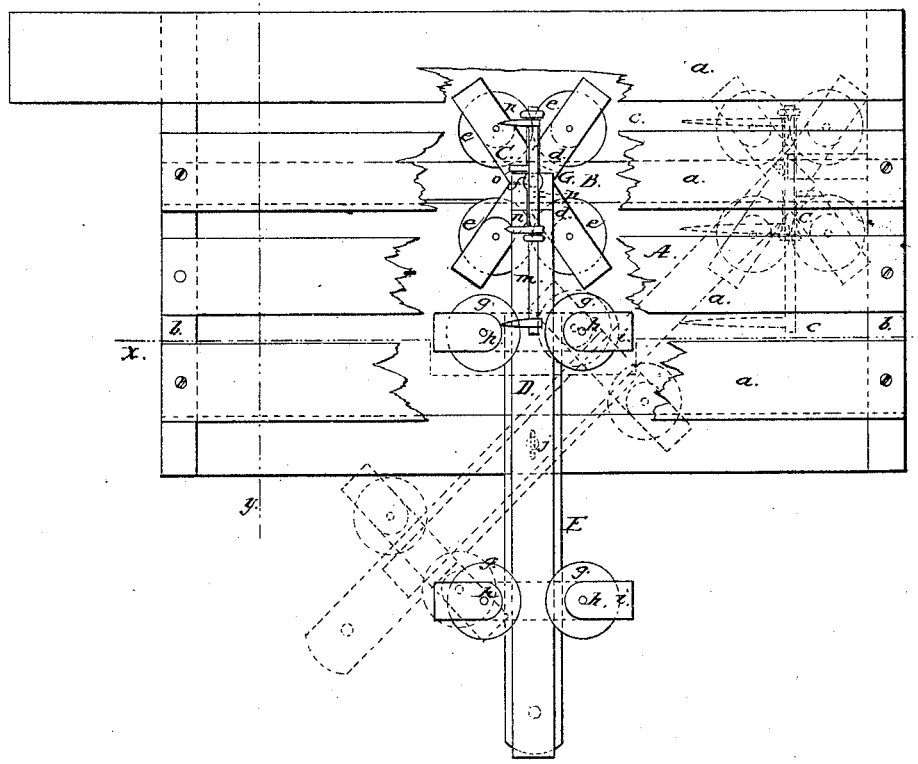
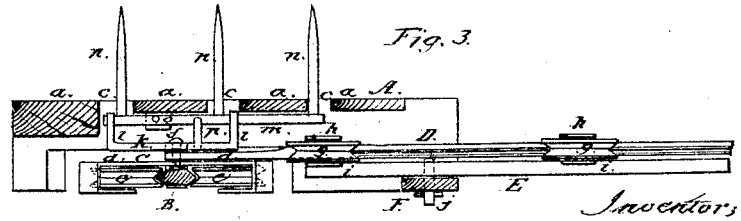
Witnesses;
Inventor;
W. S. Wilmot

UNITED STATES PATENT OFFICE.

W. S. WILMOT, OF NEW YORK, N. Y.

IMPROVEMENT IN RAKES FOR HARVESTERS.

Specification forming part of Letters Patent No. 32,493, dated June 4, 1861.

*To all whom it may concern:*

Be it known that I, W. S. WILMOT, of the city, county, and State of New York, have invented a new and Improved Raking Device for Harvesters; and I do hereby declare that the following is a full, clear, and exact description of the same, reference being had to the annexed drawings, making a part of this specification, in which—

Figure 1 is a longitudinal section of my invention, taken in the line *x x*, Fig. 2; Fig. 2, a plan or top view of the same; Fig. 3, a transverse vertical section of the same, taken in the line *y y*, Fig. 1.

Similar letters of reference indicate corresponding parts in the several figures.

This invention relates to an improvement in that class of raking devices for harvesters in which the rake is placed below the platform, the latter being slotted longitudinally, and the rake-teeth, when moving in one direction, passing up through the slots, so as to rake the cut grain from the platform, and passing down out of the slots below the platform when moving back to the spot from whence it commences its working movement.

The within-described invention consists in an improved means for operating the rake, substantially as hereinafter fully shown and described, whereby it is believed that raking devices of this class are greatly simplified, their cost of construction considerably reduced, and a more efficient machine obtained.

To enable those skilled in the art to fully understand and construct my invention, I will proceed to describe it.

A represents the platform of a harvester, which platform is composed of longitudinal strips or bars *a*, attached to suitable end pieces, *b b*, so as to leave spaces *c* between them, as shown clearly in Fig. 2.

To the under side of the end pieces, *b b*, of the platform A there is secured a bar, B, said bar having a longitudinal position with the platform, and on this bar B there is placed or fitted a small frame, C, which is composed of two cross-bars, *d d*, with horizontal rollers *e e* at their ends, the peripheries of the rollers *e* being grooved and fitted on the edges of bar B, which are beveled to correspond to the grooved peripheries of the rollers. (See Figs. 1 and 3.) This frame C, thus arranged, is allowed to slide freely back and forth on the bar B, and to the upper surface of the frame C there is attached, by a pivot or slot, *f*, a bar, D, which is fitted between grooved rollers *g*, the axes *h* of which are secured in bars *i i*, attached at right angles to a bar, E, the latter being secured by a pivot or bolt, *j*, to a longitudinal bar, F, beneath the platform. The bar E is allowed to work freely on its pivot or bolt *j*, and by giving said bar a proper vibrating movement, the frame C is moved back and forth on the bar B, the frame moving from end to end of the bar.

To the inner or front end of the bar D there is secured a horizontal bar, *k*. This bar *k* may be fitted on the bolt *f*, and it has uprights *l*, the upper parts of which serve as bearings for a rod, *m*, which has teeth *n* attached to it at right angles. The rod *m* and teeth *n* form a rake, G, and the rod *m* is allowed to turn freely in its bearings.

To the rod *m* there are attached two projecting pins, *o p*. These pins project from the rod at right angles to each other.

H is a bar, which projects horizontally from the outer end piece, *b*, of the platform. The bar H is beneath the platform and in line with the pin *o* of the rod *m* of the rake.

The operation is as follows: The bar E has a vibratory movement given it from the driving-wheel of the machine, and the frame C is moved back and forth on the bar B by said movement, the bar D sliding longitudinally on E as the latter is operated. As the frame C moves in the direction indicated by arrow 1—that is, to the outer end of the platform—the teeth *n* are kept in a horizontal position by their own gravity, the pin *o* being in contact with bar *k*, and the teeth *n* of the rake below the platform, as shown in red, Fig. 1. As the frame C reaches the outer end of the platform the pin *o* strikes the bar H, and the teeth *n* are turned up through the spaces *c* between the bars *a* of the platform, the pin *p* bearing against the bar *k* and preventing the teeth passing back beyond a vertical position. When the frame C moves toward the inner end of the platform, as indicated by arrow 2, the teeth *n* rake the cut grain from the platform, the grain, of course, keeping the teeth elevated at the return-movement of the frame C. The teeth drop in a horizontal position below the platform, so as not to offer any obstruction to the cut grain in falling on the platform. This mode of operating the rake is extremely simple, and it may be applied at a small cost. There are no parts liable to become deranged by use, and the device may, when necessary, be repaired at a trifling cost, as it contains no parts that require great skill in adjusting them in proper position.

I do not claim a slotted platform for a harvester, with a reciprocating rake provided with rising and falling teeth, for such device has been previously used; but I do claim as new and desire to secure by Letters Patent—

The combination of the pivoted sliding bar D and vibratory bar E with frame C and rake G, substantially in the manner and for the purposes herein shown and described.

W. S. WILMOT.

Witnesses:
M. M. LIVINGSTON,
C. W. COWTAN.